United States Patent [19]
Zlotin et al.

[11] Patent Number: 5,581,663
[45] Date of Patent: Dec. 3, 1996

[54] AUTOMATED PROBLEM FORMULATOR AND SOLVER

[75] Inventors: Boris Zlotin, Dearborn, Mich.; Dmitry Bushuev, Allentown, Pa.; Eugene Haimov, Allentown, Pa.; Sergey Malkin, Allentown, Pa.; Alla Zusman, Dearborn, Mich.; Alexey Tikhonov, Simferopol; Vladimir Pevnev, Sevastopol, both of Ukraine

[73] Assignee: Ideation International Inc., Southfield, Mich.

[21] Appl. No.: 231,416

[22] Filed: Apr. 22, 1994

[51] Int. Cl.⁶ .................................................. G06F 15/18
[52] U.S. Cl. ............................ 395/51; 395/10; 395/60; 395/12; 395/911; 395/919
[58] Field of Search .............................. 395/10, 12, 50, 395/75, 51, 50, 62, 60, 61, 76, 911, 912, 913, 914, 915, 916, 917, 918

[56] References Cited

U.S. PATENT DOCUMENTS

| | | | |
|---|---|---|---|
| 4,899,290 | 2/1990 | Hartzband | 395/51 |
| 5,153,830 | 10/1992 | Fisher et al. | 364/419 |
| 5,276,774 | 1/1994 | Orihara et al. | 395/51 |

OTHER PUBLICATIONS

J. de Kleer, Causal and Teleological Reasoning in Circuit Recognition, Massachusetts Institute of Technology, Report No.: AI–TR–529 (Sep. 1979), pp. 1–29,93–100, 183–190.

M. N. Huhns and R. D. Acosta, "Argo: A System for Design by Analogy," *IEEE Expert*, vol. 3, Issue 3 (Fall 1988), pp. 53–68.

A. Signoretti et al., "Implementation of Knowledge Based Environments for Computer Aided Control Engineering," 1989 *Conf. National Aerospace and Electronics* (May 1989), pp. 446–454.

M. Kawagoe et al., "TOPICA Project: Towards the Total System for Presentation and Invention by Creativity–Acceleration," 1990 *Ann'l. Hawaii Int'l. Conf. Syst. Sciences* (Jan. 1990), 389–97.

Y. Lirov, "Systematic Invention for Knowledge Engineering," *AI Expert* (Jul. 1990), pp. 28–33.

A. Cohen, "Problem Solver gives Windows a creative twist," *Computer Shopper*, vol. 12, No. 12 (Dec. 1992), p. 1014.

K. R. MacCrimmon and C. Wagner, "Supporting Problem Formulation and Alternative Generation in Managerial Decision Making," 1991 *Ann'l. Hawaii Int'l, Conf. Syst. Sciences* (Jan. 1991), pp. 432–441.

R. P. Minch and G. I. Green, "An Exploratory Study of Hypermedia Support for Problem Decomposition," 1991 *Ann'l. Hawaii Int'l. Conf. Syst. Sciences* (Jan. 1991), pp. 343–353.

(List continued on next page.)

*Primary Examiner*—Robert W. Downs
*Attorney, Agent, or Firm*—Kenyon & Kenyon

[57] ABSTRACT

A computer implemented apparatus to identify problems that exist in a real-world system and to assist in finding a solution to such problems. The apparatus has an input device for receiving a description of the real-world system as input. A memory device stores a graph being a representation of the description of the real-world system. A processor produces the graph representing the description of the real-world system. The processor also determines if the graph complies with a set of structural rules and parses the graph to produce an ordered list of problem statements, each problem statement in the ordered list of problem statements identifying a problem that exists in the real-world system. The memory also stores a network of operators, each operator linked to at least one other operator in the network of operators. Each operator includes a recommendation for solving a problem, and can also include an example of the application of the recommendation. The links between the operators represent historical routes to solutions to problems. The processor enables a user to traverse the network of operators to locate at least one operator relevant to the problem to be solved.

31 Claims, 5 Drawing Sheets

OTHER PUBLICATIONS

G. Issa et al., "Using Analogical Reasoning for Mechanism Design," *IEEE Expert*, vol. 9, Issue 3 (Jun. 1994), pp. 60–69.

D. M. Partow, "Great ideas: how you can generate breakthroughs," *Home Office Computing*, vol. 12, No. 6 (Jun. 1994), p. 85 (5).

G. S. Altshuller, *Creativity as an Exact Science—The Theory of the Solution of Inventive Problems*, translated by Anthony Williams, Gordon and Breach Science Publishers, (1988).

Dikker et al., "Towards computer–supported creative design based on Altshuller's theory of inventive problem solving", *University of Twente Memorandum*, Memoranda Informatica 92-49 (1992).

B. Kuipers, "Commonsense Reasoning about Causality: Deriving Behavior from Structure," Artifical Intelligence 24, pp. 169–203. Dec. 1984.

K. R. MacCrimmon and C. Wagner, "Expert Systems and Creativity," NATO Advanced Research Workshop on Expert Judgement and Expert Systems, pp. 173–193. Aug. 1986.

J. C. Hogge, The Compilation of Planning Operators from Qualitative Process Theory Models, University of Illinois at Urbana–Champaign Report No. UIUCDCS–R–87–1368. Sep. 1987.

E. Charniak, et al., Artificial Intelligence Programming–second edition, Lawrence Erlbaum Assoc., Pub., pp. 276–303. Dec. 1987.

KEY
→ is required for
⇒ causes
⇢ eliminates 1. obtaining metal
2. melting the ore
3. overheating the furnace walls
4. decreasing the furnace lifetime
5. cooling the furance walls
6. pumping water through pipes
7. leaking of waters into furnace
8. production defects in pipes
9. explosion of furnace

Characteristic: Optimization in time (name of operator)

Characteristic: Optimization during transport and storage

Changing form during transport

BLOCK: Expelling a substance ← *BLOCK of Auxiliary Operators*

Rejecting

BLOCK: Ready field resources ← *BLOCK of Auxiliary Operators*

BLOCK: Derivative field resources ←

Transformation to a mobile state

Transformation to a volatile state

Phase transformation

Transformation of state of aggregation

GUIDE+ ← *Pathway to Innovation Guide*

Decomposition

Oxidation

GUIDE+ ←

Combustion ← *Pathway to Innovation Guide*

GUIDE+ ←

Transformation to a fluid state

Transformation to a granular state

Dividing into parts

BLOCK: Dynamization ← *BLOCK of Block-lines*

AUTOMATED PROBLEM FORMULATOR AND SOLVER

FIELD OF INVENTION

The present invention is directed to an automated computerized aid to identify and formulate problems from a functional description of a system and to assist in finding solutions to problems.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

In the former Soviet Union during the 1940's, Genrich Altshuller devised a theory to solve problems encountered in the development of engineered systems. This theory is known as TRIZ, which is the Russian acronym for the *Theory of Inventive Problem Solving*, and was implemented manually, using books, tables and charts. The TRIZ methodology has been under development in the former Soviet Union by Genrich Altshuller and others since the mid-1940s.

The TRIZ methodology credits its success to having been built upon the accumulated technological knowledge abstracted from a systematic study of mankind's history of innovation. Genrich Altshuller and others attempted to catalog all human technological knowledge by examining, inter alia, innovative patents issued world-wide. The TRIZ methodology included study of patents to determine the way problems are solved and the innovative steps that lead to inventions.

Through the application of the TRIZ methodology, near-optimal solutions to problems can be developed. The TRIZ methodology, as proposed by Altshuller, offered separate tools (e.g., instruments or techniques) for the solving of technological problems through the resolving of Technical Contradictions (TC). A TC occurs when an improvement in some characteristic of a system results in an undesirable deterioration in some other characteristic.

Tools used according to the TRIZ methodology include *Standard Solutions, Principles of Resolving Physical Contradictions, Principles of Eliminating Technical Contradictions, Informational Funds*, and *Algorithm for Inventive Problem Solving* (Russian acronym ARIZ). These tools are documented in Altshuller's published works, including "Creativity as an Exact Science—The Theory of the Solution of Inventive Problems", first published in 1979 in Russian, translated in 1988 by Anthony Williams and published in English by Gordon & Breech Scientific Publishers Inc., New York, and expressly incorporated by reference herein; and "Searching For New Ideas; From Insight to Technology" by Altshuller, Alla Zusman, Boris Zlotin and V. Philatov, published in Russian in 1989 by Kartye Moldoveneska, also expressly incorporated by reference herein.

The classical TRIZ approach is to disparately apply each tool to the problem, and to later jointly analyze (evaluate) the results of those tools whose application proved successful.

One primary instrument of classical TRIZ methodology was the *Table of Technical Contradictions*. This two-dimensional table lists on both the X and Y axes the same thirty-nine common characteristics of technological systems, a subset of which are identifiable in virtually all such systems. One axis is labeled improve and the other deteriorate. The TC is found by selecting the two characteristics within the system under consideration that appear contradictory. At the intersection of their row and column on the Table of Technical Contradictions are several numbers. Each of these numbers represents a generalized solution to this contradiction that has been found in the history of technological development to resolve the contradiction. Traditionally, engineers resolve such contradictions by trade-offs, that is, accepting some deterioration in one characteristic to achieve a desired improvement in another. The classical TRIZ solutions seek to resolve such contradictions, not by trade-off, but rather, by improving desired characteristics without any consequent deterioration of other characteristics in the system.

When using classical TRIZ methodology, the process involved is one of using analogies, often distant or far analogies, to relate a generalized solution to the problem in the system under consideration. Often these analogies are to areas of technology entirely unrelated to the expertise of the involved engineer. As a result, the engineer is often not aware of the appropriate analogy to draw upon or does not make the connection between his/her knowledge and the problem under consideration. This has been the root cause of one of the difficulties in deploying the TRIZ methodology in the United States. Engineering education in the United States tends to be narrow and in-depth. As a result, practicing engineers have difficulty in relating to and benefiting from far analogies.

The classical TRIZ methodology has deficiencies. For example, system characteristics beyond those enumerated within the *Table of Technical Contradictions* have been identified. In other cases, although technical contradictions exist, they are not readily identifiable.

Further, in many technological systems, particularly complex ones, it is not always apparent what the real problem is that needs to be solved. The underlying or root problem is often masked by other problems, termed sub-problems, that are more apparent. These sub-problems can be solved, but their solution often does not resolve the overall problem situation. And, it is often not apparent that the root problem is not being addressed until such sub-problems have been resolved, often at a cost of great time and expense. Classical TRIZ does not provide a methodology for identifying problems that exist in a system.

Accordingly, there exists a need for a method and apparatus that identifies whether a problem exists in a system. There is a further need for a method and apparatus that identifies the underlying problems that exist in a system.

Attempts have been made to develop computer-based problem solving systems based upon the classical TRIZ methodology. By and large, these attempts have met with limited success. The algorithms and information contained within the classical TRIZ methodology were developed for manual (i.e. human) execution. They do not at all lend themselves to computer automation.

Specifically, the ARIZ tool includes a problem solving ability or algorithm. The ARIZ tool has itself gone through an evolutionary process. A version of ARIZ contained within classical TRIZ methodology was called *ARIZ*-85, first published in 1985, and described in "The Occupation to Find New Ideas" by Altshuller, B. Zlotin, and C. Filatov, published in Russian by the Kartya Moldovenynaska publishing house, expressly incorporated by reference herein.

Existing computer-based systems based upon classical TRIZ and ARIZ-85 or earlier include the "Invention Machine", developed by the Invention Machine Laboratory, of Minsk, Belarus. The Invention Machine has exhibited limited success in solving real-world technological problems.

Accordingly, there is a need for a computer-based system and method to assist users in solving problems in a system, and in particular, a computer-based system that utilizes concepts of the TRIZ methodology.

SUMMARY OF THE INVENTION

The present invention is a computer-based method and apparatus for identifying problems that exist in a system. Further, the present invention can assist users in finding solutions to problems that exist in a system.

Typically, the type of systems to which the present invention is applied are those such as engineering environments, design environments, manufacturing environments, and individual products. Examples of systems include a factory, a can-opener, a center for designing automobiles, and a plant to produce chemicals. A typical user of the present invention is, for example, an engineer or designer. Thus, typical problems that can be identified and solved using the present invention include design problems and process/manufacture problems. It is important to note that the systems to which the present invention is applied are not only to technological systems; the present invention can be used to model "systems" in virtually any field of human endeavor, such as, for example, medicine, economics, societal problems (such as finding a solution to the gun control problem in the United States), and pure science. Thus, the present invention can be used in conjunction with any system where there are problems to be identified and solved.

The representative embodiment of the present invention includes a Problem Formulator. The Problem Formulator of the present invention meets a user's need to gain a better understanding or definition of the correct problem to be addressed in a system. For example, engineers frequently do not well understand the problem at hand or in fact actually spend a great deal of time and money solving the wrong problem. The Problem Formulator can be used to identify problems in a system.

The user enters a description of a system under consideration. The description of the system is written in natural language notation, in a syntax according to the present invention. A compiler checks the syntactical correctness of the description of the system. The description of the system is stored in a memory device in the form of an oriented graph. The present invention analyzes the graph to determine if the graph represents one or more problems in the system under consideration and to determine if the description of the system is logically consistent. The present invention then makes a parse through the graph and produces an ordered list of problem statements. The problem statements identify, in natural language, problems that exist in the system under consideration.

Thus, the overall process performed by the Problem Formulator can be summarized as follows:
1. Read the source description of the system and apply syntax rules for its recognition.
2. If there are no syntax errors, produce the graph. Else, output diagnostics and skip subsequent steps.
3. Check the graph structure. If there is any violation, output diagnostics and skip subsequent steps.
4. Make a parse through the graph, and produce a list of Problem Statements arranged in specific order.

The representative embodiment of the present invention also includes a Problem Solver. The Problem Solver of the present invention is, at its highest level, a computer-based apparatus for solving technological problems for which there exists no apparent contradiction. The user merely identifies some attribute (a shortcoming) to be either improved or eliminated, or some function to be implemented. As a result, through this process, the Problem Solver can improve any technological system. In addition, new systems can often be synthesized.

The Problem Solver of the present invention allows a user to explore the solution space in much greater detail and with much more focus. Rather than just consider generalized solutions, which are often highly abstract at best, the present invention provides specific focused recommendations as problem solutions, which can often be immediately implemented. Further, the Problem Solver presents the user with solution analogies that have a significant probability of being relevant to the problem under consideration. Often these analogies would not otherwise be obvious or known to the user.

The present invention forms the basis of a computer-based technological problem solving system. The present invention does not utilize the traditional ARIZ algorithm, but rather, a new problem solving algorithm that is suitable for computer implementation and execution.

BRIEF DESCRIPTION OF THE DRAWINGS

FIG. 5 is an example of the structure of an operator.

DETAILED DESCRIPTION

Figure 1:
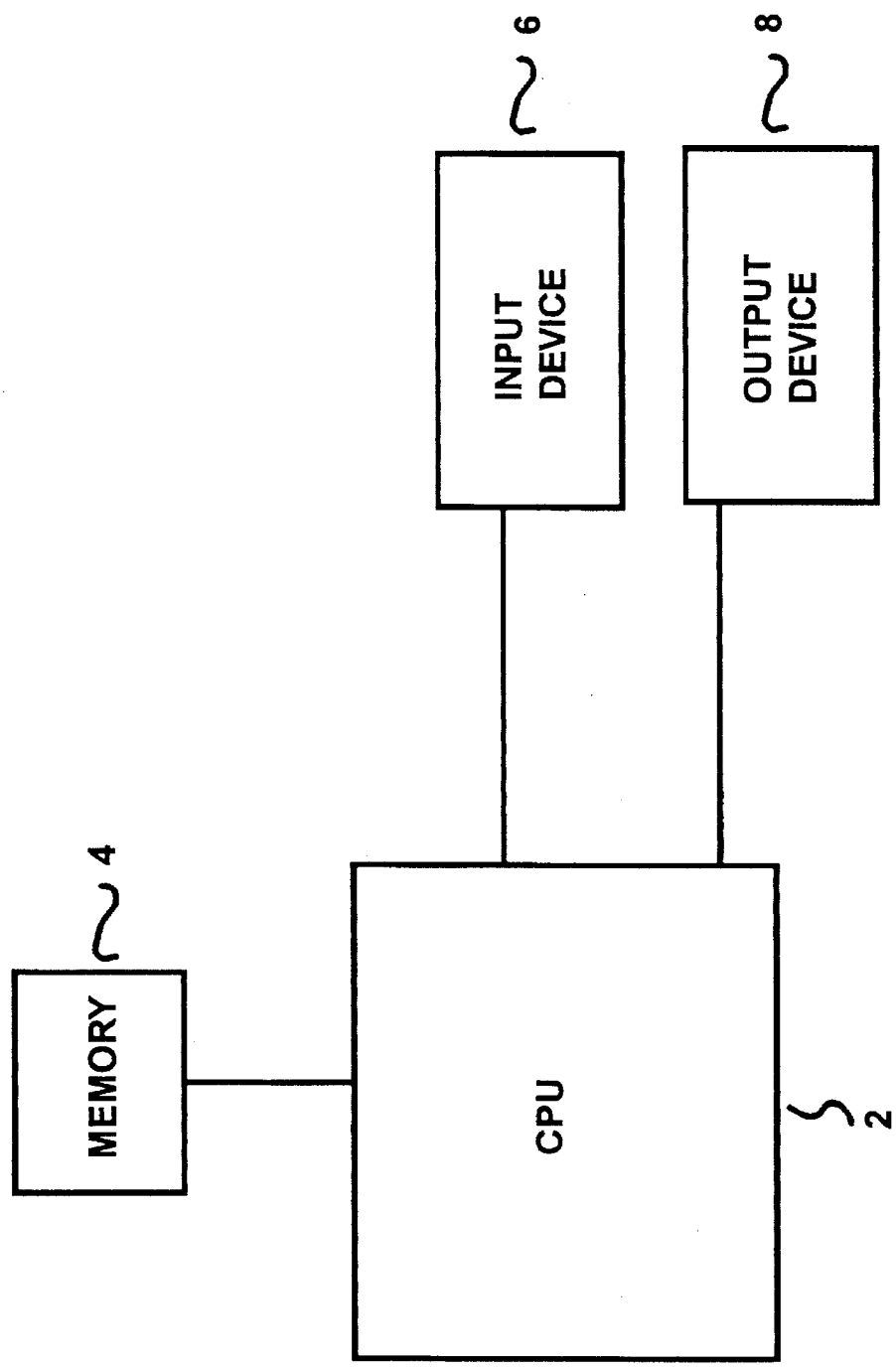
FIG. 1 is a block diagram of the representative system hardware of the present invention.

Referring now to the drawings, and initially FIG. 1, there is illustrated representative system hardware that can be utilized by a representative embodiment of the present invention. A computer processor 2, such as, for example, an IBM compatible personal computer or laptop computer, is coupled to a memory device 4. Typically, the memory device 4 is a semi-conductor memory in combination with hard disk drive or a CD-ROM drive with a compact disk. The memory device 4 can stored a computer program that embodies the method of the present invention. For example, the memory device 4 can store a Problem Formulator module and a Problem Solver module (as discussed below), can be executed by the computer processor 2.

Coupled to the computer processor 2 are an input device 6, such as a keyboard and/or a mouse, and an output device 8, such as a CRT screen. (If the computer processor 2 is a laptop computer, the processor 2, the input device 6 and the output device 8 are usually built as a single unit.) The input device 6 is used to receive, for example, instructions, commands and information about a system, from a user. The output device 8 is used to display the results of the method of the present invention, such as, for example, a problem that exists in a system or the solution to a problem.

Figure 2:
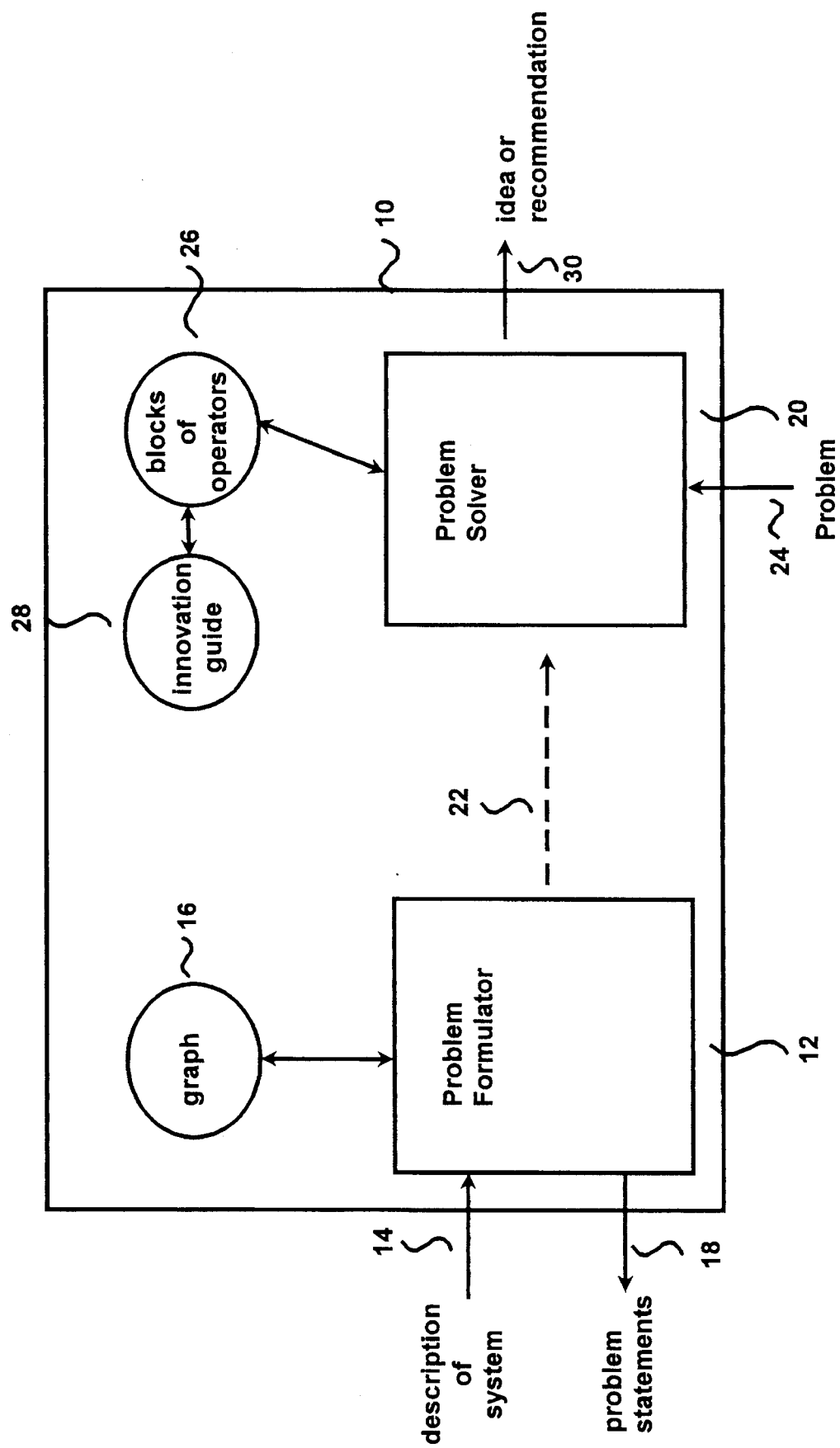
FIG. 2 is a block diagram of the components of a representative embodiment of the present invention.

Turning now to FIG. 2, there is illustrated in block diagram form the components of a representative embodiment of the present invention 10. The present invention includes a Problem Formulator 12 and a Problem Solver 20. (The Problem Solver 20 can also be called a System of Operators.) The Problem Formulator 12 and Problem Solver 20 typically are controlled by the computer processor 2.

When utilizing the Problem Formulator 12 of the present invention, a user will enter a description of a system under consideration (input 14). Typically, the user will use the input device 6 to input the description of the system. The user's input will be displayed in a window on the output device 8. The Problem Formulator 12 will create a graph 16 of the description of the system. The graph 16 can be stored in the memory device 4. Using the graph 16, the Problem Formulator 12 will produce one or more statements, each of which identifies a problem that exists in the system. The list of statements can be organized in an order and can be displayed in a window on the output device 8.

The Problem Solver 20 can receive as input one of the statements that identifies a problem as produced by the Problem Formulator 12 (see path 22). Alternatively, the user can enter a problem description without utilizing the Problem Formulator 12 (input 24). Once the problem has been entered, the Problem Solver 20 presents the user with a menu of choices. Generally, the choices relate to a subject area of potential solution, rather than an area of technology. Using the menu, the user can navigate through and access blocks of operators 26 to assist in finding a solution to the problem. Additionally, from the blocks of operators 26, the user can access an innovation guide 28. Utilizing the blocks of operators 26 in conjunction with the menu system of the Problem Solver 20 and/or the innovation guide 28, the user is able to obtain ideas and recommendations 30 to solve the problem.

The Problem Formulator 12

Overview

Understanding and defining a problem to be solved is a useful first step in the solution process of the problem. Problems are understood and defined by the context in which they exist. In the representative embodiment, the context is the technological system under development.

The Problem Formulator 12 generates problem statements. Problem statements are considered to be the formal results, i.e. the recommendations, each of which is able to solve the problem provided the user can find a way to achieve it.

The description of system (input 14) is given by user in the form of text which follows certain syntax rules, discussed below. An embedded compiler of the Problem Formulator 12 recognizes the text and checks its syntactical correctness. If the compiler detects any syntactical violation, it outputs a diagnostic message to the user which specifies the type of error and the cursor position where it was detected. All the subsequent steps are skipped in this case, for the compiler is unable to build the correct internal representation. One function of the compiler is to build the graph 16. As stated above, the internal representation of the description of the system is stored in a form of an oriented graph 16.

The second step of the procedure is to apply structural checks to the graph 16. Assumptions about the model of a representative embodiment imply that there are certain structures which should not appear in the graph 16 since those structures make the graph 16 senseless. If any of the structural checks catches this kind of error, a red pop-up is presented to the user with a specific message about the violation and a short recommendation on possible ways to correct the description of the system. As with syntax, the remainder of the algorithm is in this case skipped.

If there were no syntax and/or structural errors detected in the graph 16, a list of problem statements is generated. In the representative embodiment, this process is a combination of two methods. One is to establish a specific order of graph nodes, and another is to produce a text wording for each of these nodes. Though herein they are described separately, one should understand that in the implementation the latter is nested into the former. The algorithm for graph node ordering is referred to herein as Parsing of the Graph, while producing of the text wording is called herein Generation of Problem Statements.

Additionally, a visual representation of the graph 16 can be displayed to the user on the output device 8. The visual representation helps the user to produce a more meaningful picture of his/her system in terms of "function chains".

Description of the System

As a first step of the method performed by the Problem Formulator 12, the technological system is canonically described. This description includes an enumeration of the functional aspects of the system, hereafter "functions". Each function describes a basic or elemental operation of the system. Some functions are desirable, and some are not. A designer's goal is usually to retain all of the desirable system functions and eliminate all of those which are deemed undesirable.

The functions which comprise a system are either directly or indirectly related to each other. According to the representative embodiment of the present invention, there are a limited number of well-defined relationships or links which can exist between functions of the system.

It is noted that the traditional TRIZ methodology does not include the definition of relationships between functions.

The user describes the problem situation by naming functions and defining their relationships (links), i.e., input 14 of FIG. 2. This description of the problem situation consists of text that describes the interrelationships between useful functions which the system provides and the drawbacks (undesirable functions) which arise. The description serves as input 14 to the Problem Formulator 12. In the representative embodiment, the description adheres to a set of syntactical rules as follows:

Functions are described in words chosen by the user. Exactly the same name must be used each time when naming the same function. However, the description is not upper or lower case sensitive, nor is it sensitive to the insertion of extra spaces. Function text is enclosed in parentheses.

The interrelationship between functions is defined by selecting one from the set of link words. Link words are specially selected phrases which describe the type of relationship between functions. They have been chosen in a way such that the program can ascertain which functions are useful and which are harmful. The expression of two or more functions and their relationship forms a link statement. Link statements may span multiple lines, however each link statement ends with a period. Both direct and inverse link statements are acceptable.

In the representative embodiment, there are three types of link statements, namely, useful link statements, harmful link statements and elimination link statements. A useful link statement describes a desired relationship within a system, that should be maintained. A harmful link statement describes an undesired relationship within a system, that should be eliminated. An elimination link statement describes a relationship wherein a useful function eliminates a harmful function.

A useful link statement has "required" (and related formats) as the link word. A harmful link statement has "causes" (and related formats) as the link word. An elimination link statement has "eliminates" (and related formats) as the link word.

The following are tables to illustrate the use of the various link words. The example relates to the heat generated by an integrated circuit (IC) chip. The first line of each table is the column heading. The second and third lines of each table are the syntactical formats for the link statement. The fourth and fifth lines are examples using the link words.

To be indicative and descriptive of a problem situation (i.e., a system that has a problem), the representative embodiment of the present invention requires that the description contain at least three functions, including one or more of each of the following:

1. a useful function
2. a harmful (undesirable) function
3. a function which is required for a purpose but which causes some harmful drawback.

The description may also include useful functions—the goal of which are to eliminate the initial drawbacks, and any new drawbacks which appear due to these added methods of elimination.

TABLE 1

Useful Link Statement

| Entry forms | (Useful Function) | LINK WORD | (Useful Function). |
| --- | --- | --- | --- |
| Direct format | (source function) | Is required for | (object function). |
| Inverse format | (object function) | requires | (source function). |
| Direct example | (IC operation) | Is required for | (circuit functioning). |
| Inverse example | (Circuit functioning) | requires | (IC operation). |

TABLE 2

Harmful Link Statement

| Entry forms | (Function) | LINK WORD | (Function). |
| --- | --- | --- | --- |
| Direct format | (source function) | causes | (object function). |
| Inverse format | (object function) | Is caused by | (source function). |
| Direct example | (IC operation) | causes | (heat build-up). |
| Inverse example | (Heat build-up) | Is caused by | (IC operation). |

TABLE 3

Elimination Link Statement

| Entry forms | (Function) | LINK WORD | (Function). |
| --- | --- | --- | --- |
| Direct format | (source function) | eliminates | (object function). |
| Inverse format | (object function) | Is Eliminated by | (source function). |
| Direct example | (A heat sink) | eliminates | (heat build-up). |
| Inverse example | (Heat build-up) | Is eliminated by | (a heat sink). |

In Table 2, the source function can be any function, but the object function must be a harmful function. In Table 3, the source function must be a useful function and the object function must be a harmful function.

In addition, a means of describing a combined action of two or more source functions can be defined using the link words "TOGETHER WITH". Multiple source functions may be concatenated in this way, forming a compound link statement. Both direct and inverse compound link statements are valid. According to the syntax of the present invention, functions combined by means of TOGETHER WITH must be useful, except in the case of a harmful link statement, where both useful and harmful functions may be included. For example:

(A heat sink) together with (a fan) together with (adequate ventilation) eliminates (heat build-up).

To decrease the possibility of making errors in the problem situation description, the text can be displayed in different colors. In the representative embodiment, the color selection is automatically determined in accordance with the contents of each text fragment:

Functions—are displayed in red,
Link words—in green,
together with—in green,
Period—in green,
Parentheses—in yellow,
Comments—in white
Unrecognized text—in yellow.

In this regard, the lexical analysis of each line is automatically checked upon its entry, as it is typed.

Having completed the description of the system (i.e, a description of the problem situation), the user, in the representative embodiment, initiates the process of problem formulation by pressing a function key or mouse click.

Internal Data Structure—The Graph

The problem's internal representation is constructed in a form of the graph 16, where the nodes of the graph 16 correspond to the functions of the system, as stated by the user, and the oriented arcs correspond to links between those function. Each arc is of one of the following three types:
1. "useful" arc: corresponds to "is required for" link
2. "harmful" arc: corresponds to "causes" link
3. "eliminative" arc: corresponds to "eliminates" link As the arcs are oriented (directed), for each specific node this specification distinguishes between those arcs which begin at a node and lead to anywhere and those which start from anywhere come to the node in question as their end. The former are referred to as "outgoing arcs" while the latter as "ingoing arcs" of the node. For any node, if the ingoing set of arcs contains several arcs of the same type, then this structure is interpreted as describing simultaneous combined action or relation rather than several alternatives ways of achieving the result. For instance, the description "A is required for C. B is required for C." should be understood as that one can achieve C only by fulfilling both A and B together.

A node in the graph 16 is called "initial" if it has no ingoing arcs. A node is called "final" if is has no outgoing arcs. A final node is called "useful" if all of its ingoing arcs are of "useful" type. A final node is called "harmful" if all of its ingoing arcs are either of the "harmful" or "eliminative" types.

As a definition, for some arc X, node A is the "starting node" and node B is the "ending node" if arc X goes from A to B.

Qualifications such as "initial", "harmful", etc. apply not only to the graph nodes but also to the functions of the system which is associated with these nodes. That is, functions will be termed "initial", "harmful", etc. keeping in mind that the definition deals with their correspondent graph nodes.

In the Graph 16, certain functions are identified, by the parsing algorithm, as Actual Harmful Functions (Actual Harmful Node). In general, the difference between an Actual Harmful Function and a Harmful Function is that Actual Harmful Function is not only locally harmful (i.e. possesses ingoing harmful and/or eliminative links) but the function identifies a harmful function that actually takes place in the system i.e., it has not been successfully eliminated yet.

The formal definition of Actual Harmful Node is the following: A harmful node X is called an Actual Harmful Node if there exists the initial node A and the directed arc chain from A to X where the arcs of that chain are of useful or harmful type and no one node of that chain possesses an ingoing arc of the eliminative type.

A harmful function which is not an actual harmful function is called an "Eliminated harmful function".

To summarize, the given the above definitions, one can build the following classification of functions (Graph nodes):

```
    Initial
    Final
         - Useful
         - Harmful
               . Actual Harmful
               . Eliminated Harmful
    Other (internal)
```

Structural Checks

The purpose of structural constraints listed below is to express the correctness of the cause/effect relationships stated in the description of the system. The list below identify the constraints in the order they are checked. Some of the checking algorithms make use of the fact that the previous checks have already been passed without error. If any constraint is violated, the check sequence is interrupted with an appropriate error message, displayed to the user. As editing of the source text can change the graph's structure, each time the user edits the description of the system, the entire check sequence is repeated.

1. Check for loops and circles
2. Check for conformity of the types of ingoing arcs
3. Check for identical arcs
4. Check for multi-way dependencies
5. Check for connectedness of graph 16
6. Check for presence of problem
7. Check for local structure
8. Check for loops and circles Loops and circles are prohibited in the graph's structure. A loop is an arc which for a specific node is ingoing and outgoing simultaneously. A loop appears if the user has erroneously entered e.g., "A causes A". The algorithm for loop search does not depend on the arc type, i.e. any graph arc which starts and ends at the same node is considered a loop.

A circle is a finite sequence of arcs where the ending node of each arc serves as starting node for the next arc while the last arc ends at the starting node of the first arc of the sequence. The following is an example of a circle. "A is required for B. B is required for C. C is required for A." Though this example uses the arcs of the same type, this is not required in the definition of the circle. Thus, "A is required for B. B causes C. C eliminates A" would also be an example of what is prohibited in the graph structure.

Check for Conformity of the Types of Ingoing Arcs

The links for specification of function relationships have been intentionally chosen to allow the model to automatically determine which functions in the description are desired and which are undesired. This is done by analyzing the ingoing arcs of their correspondent nodes. This leads to the restriction that no node can possess a combination of a useful ingoing arc and any of a harmful or eliminative ingoing arcs. In other words, if the description contains a node with a useful ingoing arc and any (or both) harmful and eliminative ingoing arc, then the graph 16 is not correct.

Check for Identical Arcs

Identical arcs are simply the arcs for which starting nodes, ending nodes and the arc types coincide. Though the present invention can automatically eliminate this duplication, usually this violation indicates an often subtle error in the description of the system. So, the duplicated links are strictly prohibited and flagged.

Check for Multi-way Dependencies

Multi-way dependency is a situation in a graph 16 when there exists at least one pair of nodes for which there is more than one directed arc chain connecting them. The simplest example of such situation is "A is required for B. B is required for C. A is required for C.". Though the check is made, this situation is not considered a serious violation, and the problem formulator 12 generates only a warning message. The user is allowed to proceed further.

Check for Connectedness of Graph

Connectedness is designates that the description is integral and cannot be considered as two or more separate problem situations. Connectedness is defined as the ability to find an arc chain between any two nodes of the graph 16. An example of a non-connected graph would be "A causes B. C eliminates D." As with identical arcs, this constraint is of an ideological level and its goal is to reveal suspicious non-connected graphs. Thus, if the graph is found to be non-connected, the check and formulation sequence will be interrupted.

Check for Presence of Problem

Before formulating a list of recommendation wordings, the program checks whether the entered description really implies a problem. In terms of the internal representation, the presence of a problem means that the description includes at least one useful function and at least one actual harmful function. Otherwise there would be, e.g., "A is required for B. B causes C. D eliminates C" which means that the harmful function C has been successfully eliminated by D and there is nothing wrong with a situation such as this. The Problem Formulator 12 does not proceed beyond this check if it identifies "no problem", as the presence of a problem in the situation being described is required.

Check for Local Structure

In addition to the above described constraints, there are special cases which prevent the graph 16 from being processed. These are termed local checks because the conclusion is made for each node according to the specific combination of types of its ingoing and outgoing arcs. A special table has been developed to complete this step, and this process of checking is defined in more detail below under "Generation of Problem Statements".

Thus, in summary, the embedded compiler transforms the input text into an internal graph representation and generates a set of problem statements. In cases of syntax errors, an appropriate error message is displayed and the cursor is repositioned to the topmost line in which an error was detected.

In the case of successful compilation, analysis of the internal graph 16 representation takes place and problem statements are generated and inserted directly into the onscreen text window the corresponding link statements. The user can view either the problem statements or link statements, or both side-by-side simultaneously. In addition, a structural check of the graph is performed to test its compliance with structural constraints. If a violation is detected, an appropriate error or warning message is displayed.

4. Parsing of the Graph

After the structural check has been successfully passed, the next step is to produce the wordings for problem statements. Each problem statement incorporates a form of recommendation to resolve an identified problem situation. Since the functions are arranged into a structure in the graph 16 by their relationships, the recommendations inherit the function-to-function relationship, which leads to the intuitive impression that one problem statement is "stronger" than another. To take advantage of this relation, the Problem Formulator 12 attempts to arrange the problem statements into a list with the weakest ones at the top and the strongest at the bottom. This helps the user to experience a meaningful sequence while viewing this list, as the efficacy of the recommendation can be defined in terms of the extent of changes needed in the system to implement that recommendation.

There are two types of rules which govern a node iteration algorithm for this process. The first deals with mutual node interlocks and at each step it generates a subset of graph nodes which are ready for formulation (called the active subset). The first set of rules is termed the "interlock rules". The second type of rules are of an expert nature, their goal being to pick from the active subset one specific node which will be used as the primary node for generation of the next problem statement in the list. These second set of rules are called the "expert rules".

A Graph Parsing Algorithm selects nodes one-by-one and invokes their processing, i.e., the generation of problem statements for that node. The node for which the problem statement has already been generated is termed the processed node.

The Interlock Rules:

At each step a node A will belong to the active subset if and only if each of the following applies to it:

1. Node A has not been processed yet.
2. All the ending nodes of Node A's outgoing harmful arcs have been processed.
3. All the starting nodes of Node A's ingoing useful and eliminative arcs have been processed. (If there is no arc of the specified type and direction, then this check is considered as having been satisfied).

The Expert Rules:

Among the nodes of the active subset, the preference is given to:

1. The node adjacent to the most recently processed one. (If there are several of them, any can be chosen).
2. If there are no nodes for step 1, then the Actual Harmful Node should be selected. (If there are several of them, any can be chosen).
3. If there are no nodes for step 2, then Eliminated Harmful Node should be selected. (If there are several of them, anyone can be chosen).
4. If there are no nodes for step 3, then any node of the active subset should be selected.
5. If the active subset is empty, then make a final check:

If not all nodes had been processed output message about internal system error. halt the algorithm.

Else Successful Formulation.

End-If.

5. Generation of Problem Statements

Upon successful completion of the problem description structural check, problem statement formulation takes place in accordance with embedded rules. Two different types of problem statements are generated:

Eliminative: With the goal of eliminating a harmful function, and

Alternative: With the goal of developing an alternative means of providing a desired function.

Generation of problem statements utilize the selected node and the structure of its vicinity, i.e. the set of ingoing and outgoing arcs and their starting and ending nodes correspondingly. The text wording is built through application of the following rules to the table below.

The first step is to produce the classification code of the vicinity structure. If the node possesses any arcs from the left column, then choose each corresponding letter from the right column.

TABLE 4

| Classification Code | |
|---|---|
| Direction/type of arc in the vicinity | Corresponding Code Letter |
| Ingoing/Useful | A |
| Ingoing/Eliminative | B |
| Ingoing/Harmful | C |
| Outgoing/Useful | D |
| Outgoing/Eliminative | E |
| Outgoing/Harmful | F |

To obtain the Classification code of the vicinity node, all the selected Code Letters are grouped together. For example, AEF is a classification of the vicinity node which contains ingoing useful arc(s), outgoing eliminative arc(s), and outgoing harmful arc(s).

Since the Code Letter is associated with one or more of the vicinity nodes, it is used to represent the correspondent function/function set. With this assumption, consider the table of wordings below.

Table 5—Table of Wordings

A: Find an alternative way of (X), which does not require (A).
AD: Find an alternative way (X), which provides (D) and does not require (A).
ADE: Find an alternative way (X), which provides (D), eliminates (E) and does not require (A).
ADF, DF: Find an alternative way (X), which provides (D) and does not cause (F).
ADEF, DEF: Find an alternative way (X), which provides (D), eliminates (E) and does not cause (F).
AE: Find an alternative way (X), which prevents (E) and does not require (A).
AEF, EF: Find an alternative way (X), which eliminates (E) and does not cause (F).
B, BF: Find the way to prevent (X), which does not require (B).
BC, BCD: Find the way to prevent (X) under the condition of (C), which does not require (B).
C, CF: Find the way to prevent (X) under the condition of (C).
F: Find the way to prevent (X).

(These wordings can be varied to use other words and phrases having similar meaning, as shown for some phrases in the example below.)

The vicinity codes which are not listed here are prohibited according to the structural check.

Solutions for problems described by the problem statements can then be investigated by using the Problem Solver 20.

In summary, it is noted that the Problem Formulator 12 allows input of the description of the system in Pseudo-natural syntax, i.e., function description in free-form English (or other native language). Further, the Problem Formulator 12 checks the integrity of constraints, builds a graphical representation of the system, generates a table of Problem Statements and utilizes a unique graph parsing algorithm.

Figure 3:
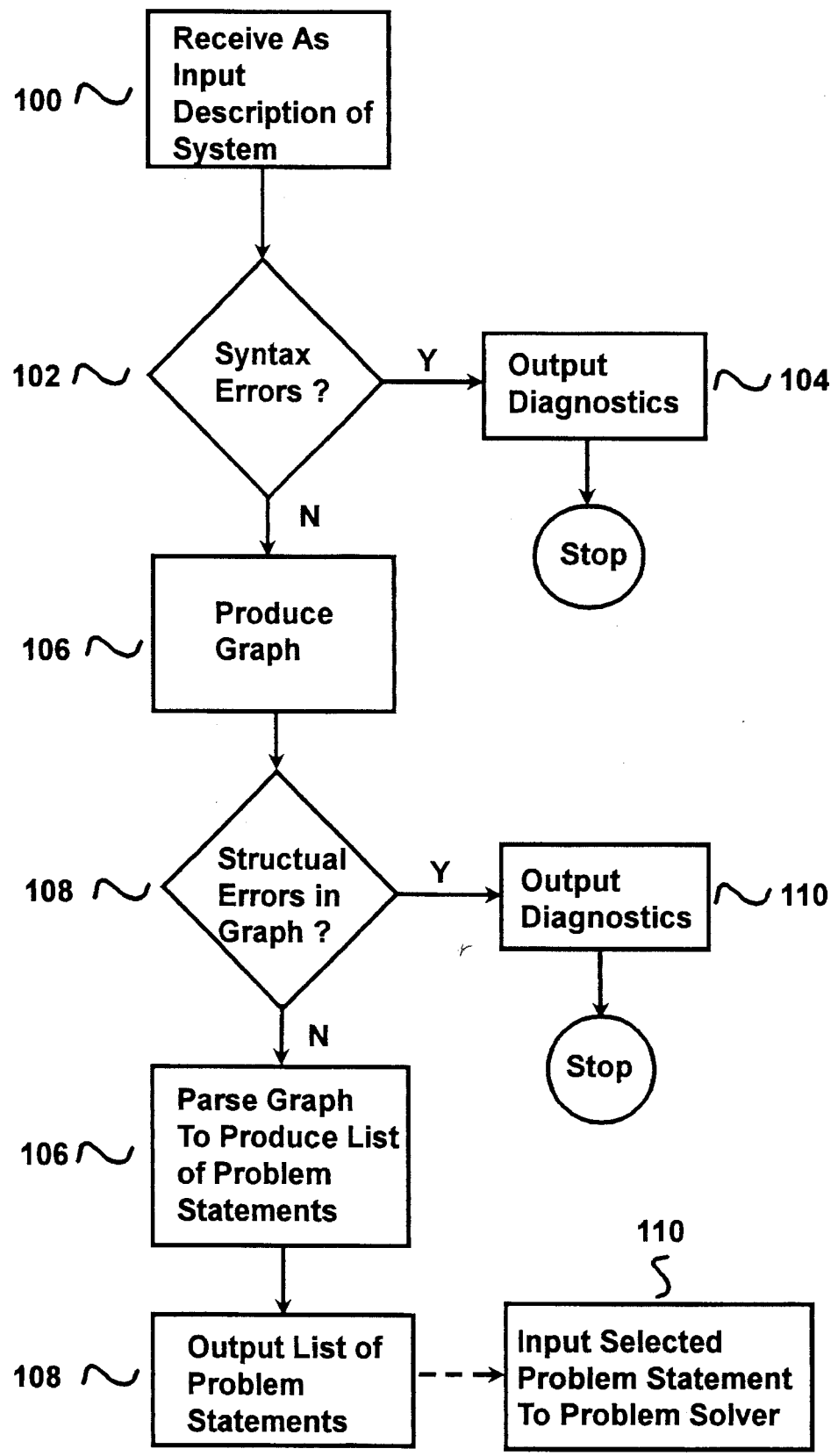
FIG. 3 is a flow chart showing the operation of the Problem Formulator of FIG. 2.

The operation of the Problem Formulator 12 can be summarized in the steps of the flow chart of FIG. 3, and described below.

Step 100.
Receive as input a description of the system.
Step 102.
Check the description of the system for syntax errors. If syntax errors, output diagnostics and stop (see step 104).
Step 106.
If there are no syntax errors, produce graph 16.
Step 108.
Perform structural check of graph 16. If structural violation, output diagnostics and stop (see step 110).
Step 106.
Make a parse through the graph, to produce a list of ordered problem statements, as follows:
(a) identify "active" nodes;
(b) select from the active nodes one node as the primary node;
(c) generate problem statement for primary node by classifying the incoming and outgoing arcs according to a classification code (see, e.g., table 4);
(d) utilize the classification code to generate problem statement using table of wordings (e.g., table 5); and
(e) repeat steps (a) to (e) until all nodes processed.
Step 108.
Output list of problem statements to user.
Step 110.
Optionally, inputting a selected problem statement to the Problem Solver 20 to assist in the generation of a solution for the problem.

EXAMPLE

The following is an example illustrating the operation of the Problem Formulator 12 of the present invention. The system under consideration concerns a problem situation in furnaces for smelting metal. The furnace walls overheat, which leads to a decrease in the lifetime of the furnace walls. To eliminate overheating, pipes were installed in the furnace, and water was pumped at high pressure through the pipes to cool the walls. This resulted in significant gains in the longevity of the furnace. However, due to thermal pressure and stress, cracks developed in the pipes, allowing water into the furnace. The water boils, causing the furnace to explode.

The description of this system, as entered by the user, is as follows:
(Melting the ore) is required for (Obtaining metal).
(Melting the ore) causes (Overheating the furnace walls).
(Overheating the furnace walls) causes (Decreasing the furnace lifetime).
(Cooling the furnace walls) eliminates (Overheating the furnace walls).
(Pumping water through pipes) is required for (Cooling the furnace walls).
(Pumping water through pipes) together with (Product defects in pipes) causes (Leakage of water into the furnace).
(Leakage of water into the furnace) causes (Explosion in the furnace).

Figure 4:
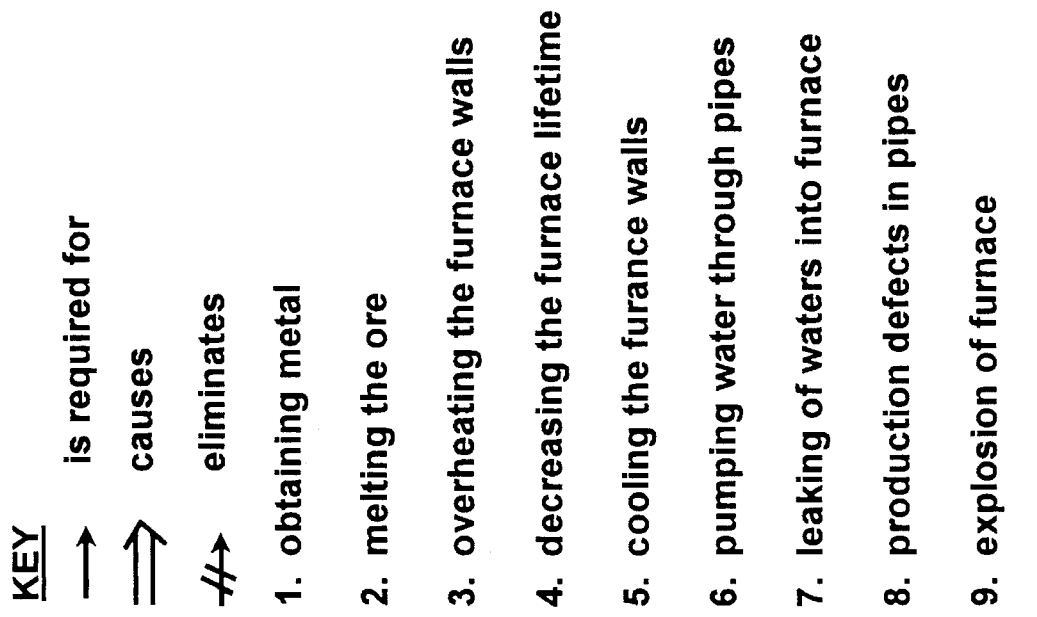
FIG. 4 is an example of a graph produced by the Problem Formulator of FIG. 2.
Figure 4:
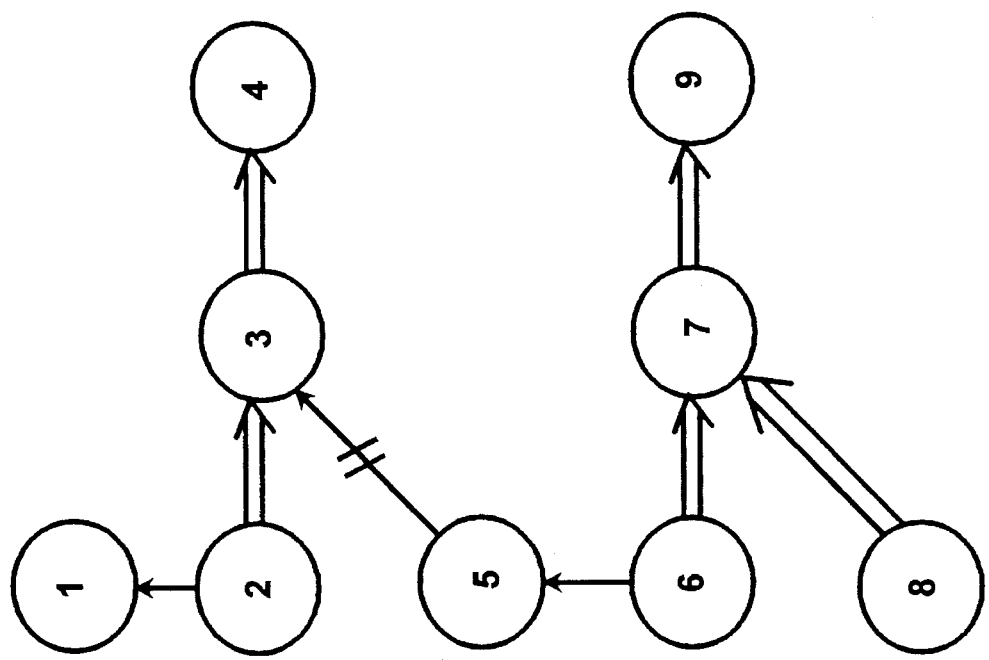

The graph 16 produced by the Problem Formulator 12 for the above description is shown in FIG. 4.

The list of ordered problems statements produced the Problem Formulator 12 is as follows:
Find the way to prevent (Explosion in the furnace) under the condition of (Leakage of water into the furnace).
Find the way to prevent (Leakage of water into the furnace) under the condition of (Pumping water through pipes) and (Product defects in pipes).
Find an alternative way of (Pumping water through pipes), which provides (Cooling the furnace walls) and does not cause (Leakage of water into the furnace).
Find an alternative way of (Cooling the furnace walls), which prevents (Overheating the furnace walls), which does not require (Pumping water through pipes).
Find the way to prevent (Decreasing the furnace lifetime) under the condition of (Overheating the furnace walls).
Find the way to prevent (Overheating the furnace walls), which does not require (Cooling the furnace walls) under the condition of (Melting the ore).
Find an alternative way of (Melting the ore), which provides (Obtaining metal) and does not cause (Overheating the furnace walls).
Find an alternative way of (Obtaining metal), which does not require (Melting the ore).

Find the way to prevent (Product defects in pipes).

To illustrate how the first problem statement above is generated, it can be seen that node 9 in FIG. 4 represents explosion of furnace. Taking node 9 as the primary node, it is seen that the only arc affecting this node is the ingoing arc from node 7 ("leakage of water into furnace"). This ingoing arc is a "causes" arc, i.e., harmfully link. From Table 4, the corresponding code letter for an ingoing harmful arc is "C". From table 5, the statement corresponding to the code letter "C" is "Find the way to prevent (X) under the condition of (C)", or, substituting the correct nodes for (C) and (X), "Find the way to prevent (Explosion in the furnace) under the condition of (Leakage of water into the furnace)."

As another illustration, consider the fourth problem statement above—"Find an alternative way of (Cooling the furnace walls), which prevents (Overheating the furnace walls), which does not require (Pumping water through pipes). This is generated when node 5 is the primary node. Taking node 5 as the primary node, it is seen that node 5 has an incoming arc from node 6 (useful) and an outgoing arc to node 3 (harmful). From Table 4, the corresponding code letter for an ingoing useful arc is "A" and for an outgoing eliminative arc is "E". From table 5, the statement corresponding to the code letters "AE" is "Find an alternative way (X), which prevents (E) and does not require (A)", or, substituting the correct nodes for (C) and (X), "Find an alternative way of (Cooling the furnace walls), which prevents (Overheating the furnace walls), which does not require (Pumping water through pipes)."

The above is an example only, illustrating one aspect of the present invention. The Problem Formulator 12 of the present invention can use the general principals illustrated above to identify many different types of problems in many systems, can determine if a system (as described) has a problem, and can produce an ordered list of problems to identify "weak" and "strong" problems.

Problem Solver 20

The Problem Solver 20 has access to a data structure, organized as blocks of Operators 26. In the representative embodiment, access to the blocks of Operators 26 is via a menu driven user interface, controlled by the Problem Solver 20.

Each block in the blocks of Operators 26 comprises a plurality of Operators. Some blocks also provide an access pathway to the innovation guide 28, as discussed below. Each Operator represents a fundamental abstract pathway to the solution of a problem through application of a technological principle or effect. For example, an Operator can contain a recommendation to make some change/improvement to the system under consideration. In the representative embodiment, the Operators have been drawn primarily from the results of previous inventors' successful experiences, as represented, in large part, by the world's innovative patents. In short, an Operator gives a recommendation as to how to solve a specified problem, and provides direction to the search for the solution to the problem by providing access paths to other (generally more specific) blocks of Operators.

Additionally, Operators can include one or more examples (that often include pictorial diagrams that can be displayed on the output device 8) as to how the recommendation provided by the Operator has been used to solve other similar problems to the problem being solved.

The Operators have been divided into three groups, namely, universal, general and specialized operators. Specialized Operators offer very precise and specific recommendations which are highly directed towards a solution. General Operators are not quite so specific, but still provide "near" (and thus more readily applicable) analogies. Universal Operators provide general recommendations ("fuzzy" recommendations) that are solutions to a wide variety of problems, not just the problem at hand. According to the same scheme, the blocks are also divided into three groups, namely, universal, general and specialized, depending on the classification of Operators that they include. Thus, it can be seen that the classification scheme is based upon the extent of precision of recommendations provided by the Operators.

The process the user goes through involves the drawing of analogies between the Operators and examples presented and the problem to be solved. For this reason, it is desirable that the user have, for each Operator and example presented, a clear mental picture and an understanding of any possible relevance. As such, the structure, content, and organization (see below) of each Operator have been carefully developed. Accordingly, as explained above, the Operators have been organized into groups termed blocks. These blocks are interrelated in a net-like structure, which, in the representative embodiment, has about 12,000 connections. The combination of blocks and connections form associative chains. The interconnections of the blocks of Operators 26 allow a user to, in effect, follow the thought process of a skilled inventor. That is, traveling from one method of problem solving to another via a series of mental associations, these associations having become richer with experience. The chain structure of the blocks of Operators 26 can thus be regarded as a network of such associations based upon what has historically been the most fruitful paths towards successful inventions.

The Operators of the present invention use concepts familiar to those trained to use the manual TRIZ methodology. Thus, a trained TRIZ user may recognize in an Operator a concept that is embodied in the TRIZ methodology. (Making use of the traditional TRIZ methodology requires a great deal of experience, as the analogies presented and therefore the recommendations given are often only remotely related to the problem under consideration.) However, unlike the TRIZ methodology which disparately applies different tools to the problem, the Problem Solver 20 of the present invention has a universally applied method for finding solutions to the problem at hand. To assist in an understanding of some of the terms used below, which have been taken from terms used in the TRIZ methodology, refer to the references cited in the background section of this disclosure, in particular Altshuller's "Creativity as an Exact Science—The Theory of the Solution of Inventive Problems."

The overall structure of the blocks of Operators 26 is set forth in Appendix A, attached hereto. The blocks are groups under the headings "Universal", "General", and "Specialized". Each block name is given and the Operators for each block are listed under the name of the block.

There are five Universal Blocks, in the representative embodiment each of which contains from one to seven universal operators. The blocks are:
Inverting
Separating
Integrating
Partial or redundant action
Splitting/Integrating (not shown on Appendix A).

There are three General Blocks, in the representative embodiment each of which contains from three to nine general operators. The blocks are:
System synthesis Elimination of a harmful action
Increasing effectiveness.

Some General Blocks have sub-blocks that have Operators. In the representative embodiment, there are a total of 32 general Operators.

There are twenty-four Specialized Blocks, each of which contains from two to eleven specialized operators. Specialized blocks fall into three categories: Useful characteristics, Expense (harmful/undesired) characteristics, and Others. Many of these Specialized Blocks are complex in structure and themselves include from one to five sub-blocks. The Specialized Blocks are:

USEFUL CHARACTERISTICS
Reliability
Longevity
Speed of action
Mechanical strength
Stability of composition
Convenience
Productivity
Manufacturing accuracy
Dosage accuracy
Form
Universality
Degree of automation
Degree of adaptation
EXPENSE CHARACTERISTICS
Weight
Overall dimensions
Energy required
Complexity of an object
Energy wasted
Time wasted
Cost
Pollution
Tool wear
OTHER SPECIALIZED BLOCKS
Synthesis of a system for obtaining information
Selective mode
Protection from a person's harmful actions In the representative embodiment, the user can select a block from a menu displayed on the output device 8, as explained in more detail below. When the block is selected, there is displayed the Operators for that block. The user may then select an Operator, resulting in the display on the output device of the initial screen for the Operator. In the representative embodiment, the initial screen for each Operator contains, at a minimum, a definition of that Operator and hypertext references to one or more examples that illustrate a technological solution based upon that Operator's principal or effect. Some examples include graphical illustrations. Examples are meant to be readily understood by all users, regardless of the individual's specific technical discipline. As such, they are as linguistically simple as possible. Further, in the representative embodiment, they are drawn primarily from mechanical (physical) systems, as these are most easily visualized by technical individuals. Operator screens may also have references to other related Operators, the domain of whose use is close. There may also be references to auxiliary blocks, as described below.

Description examples of each type of Operator and illustrative examples (both can be displayed to the user on the output device 8 to help the user arrive at a solution to the problem) are as follows:

Universal Operator: Separating Opposite Requirements in Space.

"It is required that an object satisfy contradictory requirements, for example, it should exhibit opposing properties—that is to fulfill opposing functions or operate under opposing conditions. In this situation, try to divide (either physically or mentally) the object into different parts, and allow the separate parts to each fulfill an opposing property, function, or operating condition.

Representative Example: Method of Applying Heated Coatings.

The application of coatings on metallic surfaces by chemical deposition is well-known. The essence of the method is: the metallic product is placed into pool, filled with a metallic-salt solution (nickel, cobalt). The reaction of reduction starts and metal from the solution deposits on the surface of the product. The higher the temperature, the faster the progress of the process, but, at a high temperature the solution decomposes. Up to 75% of the chemicals go to waste, settling on the bottom and pool walls. Stabilizing additions do not solve the problem. It is possible, of course, to carry out the process at a low temperature, but then the throughput decreases sharply. What is recommended is to conduct the process at a low temperature, but to first heat the detail up to a high temperature before immersion in the solution. As a result, the solution close to the detail will be hot, but elsewhere it is cold. It is also possible to achieve heating of the detail during the coating process by applying an electrical current to it."

General Operator: Drawing-off of a Harmful Action.

"It is required that an object be protected from some harmful action. In this situation, consider the introduction of some other object or substance, a mediator, which will either draw away or transform, either partially or completely, the harmful action.

Representative Example: Prevention of Pipe Damage from Freezing

Pipe damage caused by freezing of water within a pipe is a prevalent problem in colder climates. Ronald Raybone, an English inventor, proposed a solution involving the use of a unique plastic inset for water pipes. The idea is simple: as the expansion of water when freezing causes pipes to crack, if an alternate point is offered to absorb this force, the pipes will not be damaged. The aforementioned plastic inset is fashioned as an oval-sectioned hose with "wings". It is fitted through the middle of the pipe and then filled with air. Upon freezing, the water's expansion occurs towards the air-filled hose, thus protecting the pipe."

Specialized Operator: Preliminary Stress. "It is required that an object be divided into parts, in particular, to destroy it. However, this is difficult to accomplish because, for example, it requires a great deal of energy, and/or too much time, and/or the needed accuracy is difficult to achieve. In this situation, try to separate the process of division into two stages. During the first stage, at the location of the division, create internal stress. Following this, a weak effort, for example, creating a notch, will be sufficient to effect the division.

Representative Example: Die-punching Without Burrs

When punching shapes from sheet metal burrs are often formed on the workpiece (especially if the edges of the die and punch are dull). The problem can be resolved by adhering a thin layer of strong rubber or polyurethane to the end-face of the die punch. When the punch goes down, first rubber comes into contact with the metal surface, and when compressed it induces stretching stress within the metal. Next, as the sharp edge of the punch contacts the metal, easy shearing of its surface occurs at this point (it reminds one of the situation when even a sharp blade has difficulty cutting freely hanging paper, but if the paper is under stress, even a light touch of the blade is enough to cut it)."

In addition, the Operator's screen may optionally include one or more relevant direct references to the Innovation Guide 28. The Innovation Guide is an integral on-line technological encyclopedia containing definitions and applications of principles and effects that have been found to be useful in the solving of technological problems. Methods of implementing each of the principles and effects are also given, as are examples of each one's use. The Innovation Guide 28 may also be accessed directly, in effect bypassing the Problem Solver 20. This feature is of particular use when trying to develop an entirely new system to implement some function. The concept of linking operators and relevant technological knowledge is entirely new to the present invention.

The representative embodiment of the present invention also includes, as part of the blocks of Operators, Auxiliary Blocks. The entirely new concept of Auxiliary Blocks increases the ideality of developed solutions. The Auxiliary Blocks include proven methods of taking solution ideas and bringing them to the state of implementable designs. The representative embodiment includes nineteen auxiliary blocks, each containing between one and eight operators. One description of the Auxiliary Blocks of the present invention is set forth in Appendix A. It is noted that other Auxiliary Blocks can be added in the implementation of the present invention. The auxiliary blocks include:

Ready resources
Derivative resources
Introduction of a substance
Introduction of an addition
Types of additions
Using emptiness
Modification of a substance
Utilization of a substance
Modification of a field
Energy-accumulating substances
Energy-accumulating devices
Excluding elements
Partial preliminary action
Rejecting parts
Transformation into a mobile state
Transformation into a volatile state
Transformation into a fluid state
Masking
Usage of models For example, one of the Operators of Auxiliary Block "Transformation to a Volatile State", when selected by the user, will cause to be displayed on the screen the following:
Transformation to a Volatile State.

"Consider the possibility to transform the substance into a volatile state, for example, to create conditions for its evaporation, burning away, etc. Determine first whether it is possible to implement such a transformation by applying the already existing and available actions, operations, or fields.

NOTE: If you are unable to transform the substance into the volatile state right away, consider the possibility to transform it initially into the fluid or granular state, followed by a later transformation into the volatile state. If the substance is in a fluid or granular state, consider the possibility to replace it with a substance that evaporates.

Representative Example: Clay Jugs as Thermal Insulators

Thin-walled clay vessels have good thermal conductivity, making them excellent for cooking. However, this same property renders them worthless for keeping foods hot, as they dissipate heat quickly. Ancient potters were able to produce clay vessels which kept food hot. When forming the vessel, they created an interior cavity and filled it with reed fluff, which was then burned away during the vessel's baking."

Technological systems evolve along predictable paths or lines of evolution. By evaluating the current state of a system, and mapping that state onto these lines, one can in effect predict the future evolution of a system. To facilitate the use of such a forecasting tool by engineers, the concept of Block-lines has been developed and incorporated into the blocks of Operators 26. Block-lines allow a designer to either develop better (more advanced) solutions to problems, or to develop a technological system by providing the system with new and useful characteristics.

The representative embodiment includes seven block-lines, each containing between two and ten Operators. The block-lines and their Operators are set forth in Appendix A. The block-lines include:

Creating bi- and poly-systems
Splitting
Reducing
Structuring
Dynamization
Increasing controllability
Universalization For example, one Operator that can be selected from the "Reducing" block-line is the "Self-Service" Operator. If the user selects the Self-Service Operator, the following is displayed to the user:
Self-Service.

"Test your object for self-service. For this purpose consider any possibility to fulfill auxiliary operations at the expense of general ones, or simultaneous with principal ones. You may also transfer the implementation of auxiliary functions onto principal elements, thereby eliminating the corresponding auxiliary elements from the system. In particular, consider the possibility of utilizing existing or fundamental energy within the system for implementation of auxiliary functions.

Representative Example: Corrosion Testing

Testing of the degree of a material's resistance to aggressive mediums (acids) is generally achieved by producing a cube of the material to be tested and submerging it in the medium (acid). The aggressive medium is held at a fixed temperature for a predetermined period of time. Next, the cube is thoroughly washed, dried, and weighed to determine its loss of mass. Such experiments are usually performed in platinum vessels, because platinum is the most corrosion-resistive material. However, because platinum is very expensive, there is no opportunity to perform simultaneous tests of different materials. Sequential testing often takes too long. A method of corrosion testing was proposed which doesn't require platinum. Samples to be tested are formed into vessels, into which the aggressive medium can be placed."

Turning now to FIG. 5, there is illustrated a detailed example of the links between the Operator "Optimization Characteristics In Time" (also called "Optimization in Time") of the "Separating" block (which is a Universal block). As noted above, an Operator can be linked to other Operators, blocks, and the Innovation Guide 28. Each line of the description of FIG. 5 represents a link to a block, Operator or the Innovation Guide 28. (Those lines whose type is not identified in FIG. 5 are other Operators.) When the "Optimization Characteristics In Time" Operator is displayed to the user on the output device 8, each link is displayed as a choice to the user. If the user selects a link, the Problem Solver 20 causes the screen representing the Operator, block or the Innovation guide 28 to be displayed.

Screens represented by each level of indentation have direct links to those one level further indented to the right. The user can freely traverse up and down (forward and backward) through this link structure.

Thus, the present invention includes unified system of Operators 26 to assist a user in solving a problem. Each Operator represents a fundamental abstract pathway to the solution of a problem through application of a principle or effect. The representative embodiment of the present invention includes approximately 400 Operators, many of which can be accessed from more than one block. The blocks of Operators 26 are organized both in a tree structure and as a network of interrelated Operators. Thus, using the Problem Solver 20, and by traversing the blocks of Operators and back-tracking through the blocks of Operators, the user is often able to obtain more than one idea, recommendation or solution to the problem under consideration.

The Innovation Guide 28 of the present invention informs a user, once the user has an idea, how to perform the idea. In the representative embodiment, the Innovation Guide 28 comprises, for example, information about engineering usage of scientific knowledge.

Illustration

The following is an illustrative description of the operation of the Problem Solver 20 by a user. This is an example of the representative embodiment only, and the present invention is not so limited in content or scope.

When the user activates the Problem Solver 20 of the present invention, an information window can be displayed, giving general advice to the user as to the operation of the Problem Solver 20. For example, the information window may state:

"Most software works according to the principle: a person directs the computer to do something and the computer does so. However, this system is quite different. The computer recommends what should be done and the user acts according to the computer's recommendations."

The next screen that is displayed is the main menu screen. The main menu gives the user a means of direct access to the Problem Formulator 12 and the Innovation Guide 28. Also, the main menu gives the user a number of ways to access the blocks of Operators and the information therein. According to the present invention, there are two ways to access the blocks of Operators 26, namely, Primary mode and Fast Search Mode.

The Fast Search mode allows the user to access the Operators in a tree-like menu structure. If the user selects the Fast Search mode from the main menu, a second level menu is displayed, giving the user the following choices: Universal blocks; General blocks; Auxiliary blocks; and Block-lines. (Thus, the structure presented to the user is similar to that set forth in Appendix A.) If the user selects "Universal Blocks", then a third level menu is displayed, giving the user the following choices: Partial/Excessive Action; Inversion; Separating; Integrating; and Splitting-Integrating. If the user selects "Inversion", then a fourth level menu is displayed, giving the user the following choices: Substitution for an action by an opposing one; Inversion of movable and unmovable parts; Head-over-heels object. If the user selects "Inversion of movable and unmovable parts", then an selected Operator is displayed to the user. In this instance, the idea or recommendation displayed is:

"Consider the possibility of transformation of the system's immovable parts into movable ones, and movable into immovable"

Also presented to the user is to choice to view an example, plus the choice to move to a related Operator, namely "Altering dynamic movement of an object."

The Primary mode access method presents to the user three choices, displayed on the main menu, namely, "Elimination of a Shortcoming", "Synthesize a New System", and "Universal Operators".

If the user selects "Elimination of a Shortcoming", then a second level menu is displayed, having two columns. The first column is titled "Undesired Factor" and lists as possible choices: Harmful action; High characteristic of expense; and Useful actions are incompatible. The second column is titled "Useful effect needs to be increased" and lists as possible choices: Useful function is insufficient; and Useful characteristic is insufficient.

If the user selects, for example, "Useful function is insufficient", then the following choices are displayed to the user: Increasing overall effectiveness; and improving system's useful functions. If the user then selects, for example, "Increasing overall effectiveness", then the following choices are displayed to the user: Creating bi- and poly-systems; splitting; reducing; structuring a substance; increasing controllability; and element universalization. If the user selects, for example, "Splitting", then the following choices of Objects (as set forth in the Block-lines section of Appendix A) are displayed to the user: Making an object dismountable; Splitting into simple-shaped parts; Pulverizing; and Link degeneration during splitting. Thus, if the user selects "Making an object dismountable", then the following idea or recommendation is presented to the user:

"Try to make your object dismountable. If possible, assemble your object (partially or completely) out of existing, standard blocks (modules)."

The user is also given the choice to select and view three examples.

Alternatively, if the user selected "Harmful action" from the first column, a screen titled "Eliminating an Undesired Action" is displayed. This screen has a menu of choices, listing twelve Operators/blocks (e.g., isolation; counteraction; impact on an undesired action; anti-action; etc.) that the present invention suggests to the user should be worked with in the order displayed on the screen, as well as a submenu that lists three Specialized Operators (namely, Pollution; Tool wear; and Protection from a person's dangerous actions.)

The above illustration gives examples to show how the blocks of Operators 26 can be accessed in many ways when solving a problem. The organization of the links between the blocks of Operators depends upon the actual type of system (domain) from which the problem arises. The Problem Solver 20 of the present invention accordingly has general applicability, and can be designed to solve many problems from different technical fields.

What is claimed is:

1. A computer-based method to determine and identify problems that exist in a real-world system, the method comprising the steps of:

receiving as input a description of the real-world system in natural language according to a predetermined syntax;

determining if the description complies with the predetermined syntax;

producing a graph representing the description;

determining if the graph complies with a set of predetermined structural rules; and parsing the graph to produce an ordered list of problem statements, each problem statement in the ordered list of problem statements identifying a problem that exists in the real-world system.

2. The computer-based method of claim 1 further comprising the step of outputting the ordered list of problem statements to a user.

3. The computer-based method of claim 2 further comprising the steps of:

enabling the user to select a problem statement from the ordered list of problem statements; and inputing the selected problem statement to a computer-based problem solver to determine a possible solution for the selected problem.

4. The computer-based method of claim 1 wherein the graph comprises a plurality of nodes and a plurality of directional arcs between nodes.

5. The computer-based method of claim 4 wherein the step of parsing the graph to produce an ordered list of problem statements further comprises the steps of:

(a) selecting a node;

(b) for the selected node, classifying each arc entering and leaving the selected node according to a classification scheme wherein a classification code is generated for each arc entering and leaving the selected node;

(c) utilizing the generated classification codes to index a table of wordings to locate an entry, wherein the located entry in the table of wordings comprises a skeleton of a problem statement;

(d) inserting nodal information in the skeleton of the problem statement; and (e) repeating steps (a) to (d) to produce a list of problem statements until all nodes in the graph are processed.

6. The computer-based method of claim 1 wherein the description of the real-world system in natural language according to the predetermined syntax comprises a set of description statements, each description statement including two functions and a relationship between the two functions.

7. The computer-based method of claim 6 wherein the relationship between the two functions is represented by a useful link word.

8. The computer-based method of claim 6 wherein the relationship between the two functions is represented by a harmful link word.

9. The computer-based method of claim 6 wherein the relationship between the two functions is represented by an eliminative link word.

10. The computer-based method of claim 6 wherein the two functions are each represented by a node in the graph.

11. The computer-based method of claim 6 wherein the relationship between the two functions is represented by a directional arc in the graph.

12. The computer-based method of claim 1 further comprising the step of displaying a representation of the graph on a computer screen.

13. The computer-based method of claim 1 further comprising the steps of:

outputing the ordered list of problem statements to a user;

enabling the user to select a problem statement from the ordered list of problem statements;

determining a solution to the problem represented by the selected problem statement; and modifying the real-world system to overcome the problem.

14. The computer-based method of claim 1 wherein the step of determining if the graph complies with a set of predetermined structural rules includes the step of checking the graph for loops and circles.

15. The computer-based method of claim 1 wherein the step of determining if the graph complies with a set of predetermined structural rules includes the step of checking the graph for multi-way dependencies.

16. The computer-based method of claim 1 wherein the step of determining if the graph complies with a set of predetermined structural rules includes the step of checking the graph for presence of a problem.

17. The computer-based method of claim 1 wherein the real-world system is a design system.

18. The computer-based method of claim 1 wherein the real-world system is a manufacturing plant.

19. The computer-based method of claim 1 wherein the real-world system is a product.

20. A computer-based method for identifying problems that exist in a real-world system, the method comprising the steps of:

receiving as input a description of the real-world system;

producing a graph representing the description of the real-world system;

determining if the graph complies with a set of predetermined structural rules; and parsing the graph to produce an ordered list of problem statements, each problem statement in the ordered list of problem statements identifying a problem that exists in the real-world system.

21. The computer-based method of claim 20 further comprising the step of outputting the ordered list of problem statements to a user.

22. The computer-based method of claim 20 further comprising the steps of:

enabling a user to select a problem statement from the ordered list of problem statements; and inputing the selected problem statement to a computer-based problem solver to determine a possible solution for the selected problem.

23. The computer-based method of claim 22 further comprising the steps of:

providing a network of operators, each operator linked to at least one other operator in the network of operators, each operator including a complete solution recommendation and at least one example of an application of the complete solution recommendation, wherein the links between operators represent a recommended direction to obtain an alterative complete solution recommendation and wherein the operators in the network of operators include (i) specialized operators having precise and highly directed solution recommendations highly directed to a solution, (ii) general operators having solution recommendations for analogous problems, and (iii) universal operators having generalized solution recommendations;

traversing, via a menu structure, the network of operators to locate an operator relevant to the selected problem; and outputting a complete solution recommendation for solving the selected problem as specified in the operator relevant to the selected problem and, if requested by the user, at least one example of an application of the complete solution recommendation as specified in the operator relevant to the selected problem.

24. The computer-based method of claim 22 further comprising the steps of:

providing a network of operators, each operator linked to at least one other operator in the network of operators, each operator including a complete recommendation for solving a problem, wherein the links between the operators represent historical routes to solutions of problems;

traversing the network of operators to locate two or more operators relevant to the selected problem; and outputting each recommendation for solving the selected problem as specified in each two or more operators relevant to the selected problem, each recommendation representing an alternative complete solution recommendation relevant to the selected problem.

25. The method of claim 24 wherein the operators in the network of operators are grouped by subject area of potential solution and not subject area of technology.

26. The computer-based method of claim 20 further comprising the step of displaying a representation of the graph on a computer screen.

27. The computer-based method of claim 20 wherein the step of determining if the graph complies with a set of predetermined structural rules further comprises the step of checking the graph for presence of a problem.

28. A computer-based method for identifying a problem that exists in a real-world system and providing a recommendation for a solution to the problem, the method comprising the steps of:

receiving as input a description of the real-world system;

producing a graph representing the description of the real-world system;

determining if the graph complies with a set of predetermined structural rules;

parsing the graph to produce an ordered list of problem statements, each problem statement in the ordered list of problem statements identifying a problem that exists in the real-world system;

enabling a user to select a problem statement from the ordered list of problem statements; and providing a network of operators, each operator linked to at least one other operator in the network of operators, each operator including a problem solving recommendation, wherein the links between the operators represent historical routes to solutions of problems;

traversing the network of operators to locate an operator relevant to the selected problem; and outputting the problem solving recommendation for solving the selected problem as represented by the operator relevant to the selected problem.

29. A computer implemented apparatus for identifying problems that exist in a real-world system, the apparatus comprising:

an input device for receiving as input a description of the real-world system;

a memory for storing a graph being a representation of the description of the real-world system; and a processor coupled to both the input device and the memory, the processor including:

means for producing the graph representing the description of the real-world system, means for determining if the graph complies with a set of predetermined structural rules, and means for parsing the graph to produce an ordered list of problem statements, each problem statement in the ordered list of problem statements identifying a problem that exists in the real-world system.

30. The apparatus of claim 29 further comprising an output device coupled to the processor for outputting the ordered list of problem statements to a user.

31. The apparatus of claim 30 wherein the processor further comprises means for displaying a representation of the graph on the output device.

* * * * *